(12) United States Patent
Larson

(10) Patent No.: US 12,516,746 B2
(45) Date of Patent: Jan. 6, 2026

(54) REMOTELY CONTROLLED VALVE OPERATOR

(71) Applicant: Mueller International, LLC, Atlanta, GA (US)

(72) Inventor: Ryan Fairchild Larson, Decatur, IL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 18/584,697

(22) Filed: Feb. 22, 2024

(65) Prior Publication Data

US 2025/0271078 A1    Aug. 28, 2025

(51) Int. Cl.
*F16K 31/46* (2006.01)
*F16K 31/50* (2006.01)
*F16K 31/53* (2006.01)

(52) U.S. Cl.
CPC ............ *F16K 31/46* (2013.01); *F16K 31/502* (2013.01); *F16K 31/53* (2013.01)

(58) Field of Classification Search
CPC ...... F16K 31/041; F16K 31/055; F16K 31/53; F16K 31/535; F16K 31/46
See application file for complete search history.

(56) References Cited

U.S. PATENT DOCUMENTS

| 5,197,338 | A | 3/1993 | Heiman et al. |
| 6,079,442 | A | 6/2000 | Raymond, Jr. |
| 6,590,557 | B1 | 7/2003 | Seike |
| 6,662,821 | B2 | 12/2003 | Jacobsen et al. |
| 6,701,951 | B1 | 3/2004 | Drinkwater |
| 6,768,234 | B2 | 7/2004 | Aoki |
| 6,786,465 | B1 | 9/2004 | Beswick et al. |
| 6,840,503 | B2 | 1/2005 | Fortino |
| 6,885,119 | B2 | 4/2005 | Aoki |
| 6,957,801 | B2 | 10/2005 | Wilfert et al. |
| 7,111,817 | B2 | 9/2006 | Teti et al. |
| 7,114,700 | B2 | 10/2006 | Beswick et al. |

(Continued)

FOREIGN PATENT DOCUMENTS

| CN | 113932031 |   | 1/2022 |
| CN | 114069932 | A * | 2/2022 |

(Continued)

OTHER PUBLICATIONS

Amazon.Com; Article entitled: "M-Series Valve Actuator with 1/4" metering Valve"", located at <https://www.amazon.com/M-valve-actuator-%C2%BC-metering/dp/B079J6WKQY>, accessed Sep. 7, 2022, Copyright 1996-2022, 5 pgs.

(Continued)

*Primary Examiner* — Marina A Tietjen
(74) *Attorney, Agent, or Firm* — Taylor Duma LLP

(57) ABSTRACT

A remotely controlled valve operator includes a cap actuator comprising a cap engagement portion and a toothed gear portion, the cap engagement portion configured to operatively engage a valve cap of a valve; and a drive system comprising a motor and a sprocket, the motor remotely controlled by a controller and configured to drive rotation of the sprocket, the sprocket engaging the toothed gear portion of the cap actuator to rotate the cap actuator between an activated position and a deactivated position.

18 Claims, 10 Drawing Sheets

(56) References Cited

U.S. PATENT DOCUMENTS

| | | | |
|---|---|---|---|
| 9,016,662 | B2 | 4/2015 | Staffiere et al. |
| 9,671,031 | B2 | 6/2017 | Ben Old |
| 9,989,163 | B2 | 6/2018 | Stumpp |
| 10,161,539 | B1 | 12/2018 | Lin |
| 10,208,804 | B2 | 2/2019 | Bamberger et al. |
| 10,428,721 | B2 * | 10/2019 | Murakami ............ F16K 31/041 |
| 10,508,422 | B2 | 12/2019 | Sharratt et al. |
| 10,962,133 | B2 | 3/2021 | Hillo |
| 11,054,055 | B2 | 7/2021 | Sakautzky |
| 11,098,464 | B2 | 8/2021 | Sharratt et al. |
| 11,105,705 | B1 | 8/2021 | Lowitz et al. |
| 11,226,052 | B2 | 1/2022 | Tsai |
| 11,391,386 | B2 | 7/2022 | Thuillard et al. |
| 2001/0035510 | A1 * | 11/2001 | Oh ...................... F16K 37/0041 251/129.03 |
| 2009/0322359 | A1 | 12/2009 | Rho et al. |
| 2013/0140475 | A1 | 6/2013 | Burgess et al. |
| 2014/0264111 | A1 | 9/2014 | Porter et al. |
| 2017/0122181 | A1 * | 5/2017 | Murakami ............ F16K 31/002 |
| 2019/0309873 | A1 * | 10/2019 | Robbins ................ F16K 31/535 |
| 2020/0153131 | A1 | 5/2020 | Soubjaki et al. |
| 2020/0248828 | A1 | 8/2020 | Thuillard et al. |
| 2020/0318751 | A1 | 10/2020 | Tanaka |
| 2021/0102439 | A1 | 4/2021 | Kajaria |
| 2021/0194074 | A1 | 6/2021 | Wiggins et al. |
| 2022/0074513 | A1 | 3/2022 | Mueller et al. |
| 2022/0275878 | A1 | 9/2022 | Diesen |

FOREIGN PATENT DOCUMENTS

| | | | |
|---|---|---|---|
| CN | 115183042 | A * | 10/2022 |
| KR | 200327595 | Y1 * | 9/2003 |
| KR | 20060125942 | | 12/2006 |
| KR | 20070090702 | | 9/2007 |
| KR | 20240009632 | | 1/2024 |

OTHER PUBLICATIONS

Larson, Ryan Fairchild; International Search Report and Written Opinion for PCT Application No. PCT/US2025/016554, filed Feb. 20, 2025, mailed May 15, 2025, 12 pgs.

* cited by examiner

REMOTELY CONTROLLED VALVE OPERATOR

TECHNICAL FIELD

This disclosure relates to water metering. More specifically, this disclosure relates to a remotely controlled valve operator for a meter valve.

BACKGROUND

Meter assemblies typically comprise a meter and a meter valve. The meter valve controls the flow of fluid from a pipeline system into the meter, and the meter measures a flow rate of the water or other fluid through the meter assembly. Meter assemblies often are contained within a housing comprising a removable lid. To operate the meter valve, a human operator must typically remove the lid from the housing and manually actuate the meter valve.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a remotely controlled valve operator comprising a cap actuator comprising a cap engagement portion and a toothed gear portion, the cap engagement portion configured to operatively engage a valve cap of a valve; and a drive system comprising a motor and a sprocket, the motor remotely controlled by a controller and configured to drive rotation of the sprocket, the sprocket engaging the toothed gear portion of the cap actuator to rotate the cap actuator between an activated position and a deactivated position.

Also disclosed is a remotely controlled valve assembly comprising a valve comprising a valve body and a valve cap; and a remotely controlled valve operator comprising: a cap actuator comprising a cap engagement portion and a toothed gear portion, the cap engagement portion operatively engaged with the valve cap; and a drive system comprising a motor and a sprocket, the motor remotely controlled by a controller and configured to drive rotation of the sprocket, the sprocket engaging the toothed gear portion of the cap actuator to rotate the cap actuator between an activated position and a deactivated position; wherein, in the activated position, the cap actuator actuates the valve cap to an open position and fluid is permitted to flow through the valve, and in the deactivated position, the cap actuator actuates the valve cap to a closed position and fluid is prohibited from flowing through the valve.

Additionally, disclosed is a method of remotely controlling a valve, the method comprising providing a remotely controlled valve operator, the remotely controlled valve operator comprising: a cap actuator comprising a cap engagement portion and a toothed gear portion, the cap engagement portion engaging a valve cap of the valve; and a drive system comprising a sprocket engaging the toothed gear portion of the cap actuator and a motor for driving rotation of the sprocket, the motor remotely controlled by a controller; remotely actuating the motor with the controller to rotate the sprocket; rotating the cap actuator between a deactivated position and an activated position with the sprocket; and actuating the valve cap with the cap actuator between a closed position, wherein fluid is prohibited from flowing through the valve, and an open position, wherein fluid is permitted to flow through the valve.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
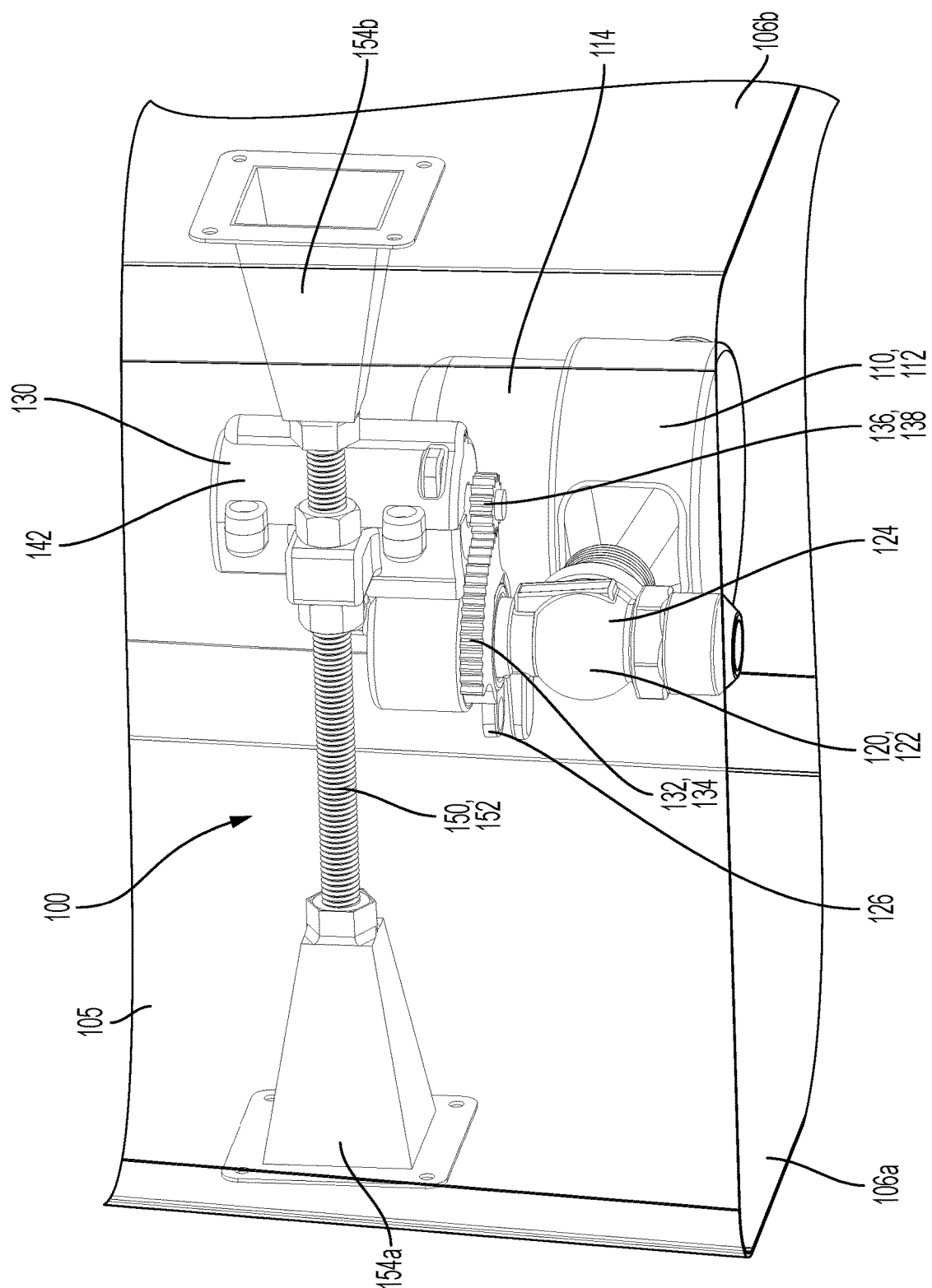
FIG. 1 is a left-side perspective view of a meter assembly comprising a meter, a meter valve, and a remotely controlled valve operator, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a remotely controlled valve operator and associated methods, systems, devices, and various apparatus. Example aspects of the remotely controlled valve operator can comprise a cap actuator and a drive system. It would be understood by one of skill in the art that the remotely controlled valve operator is described in but a few exemplary embodiments among many. No particular terminology or description should be considered limiting on the disclosure or the scope of any claims issuing therefrom.

FIG. 1 is a perspective view of a meter assembly 100, in accordance with one aspect of the present disclosure. In example aspects, the meter assembly 100 can be housed within a meter box 105, which may be located above or below ground. The meter box 105 may or may not comprise a lid in example aspects. The meter box 105 is illustrated as transparent in the present aspect to allow visibility of the meter assembly 100 housed therein. According to example aspects, the meter assembly 100 can comprise a meter 110, a meter valve 120, and a remotely controlled valve operator 130 coupled to the meter valve 120 and configured to control the actuation of the meter valve 120 between a closed configuration and an open configuration. The meter 110 can comprise a meter main case 112 and a meter cap 114. A water meter register (not shown) can be enclosed by the meter main case 112 and the meter cap 114. Example aspects of the meter assembly 100 can further comprise a meter swivel nut (not shown) connecting the meter valve 120 to the meter 110. Example aspects of meter swivel nuts are disclosed in U.S. application Ser. No. 18/386,197, filed Nov. 1, 2023, which is hereby specifically incorporated by reference herein in its entirety.

According to example aspects, the meter assembly 100 can be connected to a pipeline system carrying fluid therethrough. The pipeline system can be, for example, a municipal water pipeline system carrying water to commercial or residential buildings. The meter valve 120 can control the flow of fluid from the pipeline system into the meter 110. The meter valve 120 can be a ball angle meter valve 122 in the present aspect; however, in other aspects, the meter valve 120 can be any other suitable type of valve known in the art. The meter 110 of the meter assembly 100 can measure a flow rate of the water or other fluid through the meter assembly 100. Examples of such meter valves and meters are disclosed in U.S. Pat. No. 7,854,165, which issued on Dec. 21, 2010, U.S. Pat. No. 9,664,550, which issued on May 30, 2017, and U.S. application Ser. No. 17/683,111, filed on Feb. 28, 2022, each of which is hereby specifically incorporated by reference herein in its entirety. In other aspects, the pipeline system can be any other suitable type of pipeline system, and the meter 110 can measure the flow rate any other suitable fluid, including liquids and gases, therethrough. In other aspects, the valve operator 130 can be used on any other suitable type of valve and/or in any other suitable application outside of metering.

The valve operator 130 can engage the meter valve 120 and can be remotely controlled to actuate the meter valve 120 between the open configuration and the closed configuration. In the open configuration, fluid can flow through the meter valve 120 into the meter 110, and in the closed configuration, fluid can be prohibited from flowing into the meter 110. The meter valve 120 can comprise a valve body 124 and a valve cap 126. According to example aspects, the valve operator 130 can comprise a cap actuator 132 configured to engage the valve cap 126 of the meter valve 120 and a drive system 136 configured to drive movement of the cap actuator 132 between an activated position and a deactivated position. In the activated position of the cap actuator 132, the cap actuator 132 can apply a torque to the valve cap 126 to rotate or otherwise orient the valve cap 126 to an open position, relative to the valve body 124. In the deactivated position of the cap actuator 132, the cap actuator 132 can apply a torque to the valve cap 126 to rotate or otherwise orient the valve cap 126 in a closed position, relative to the valve body 124. In the closed position of the valve cap 126, the meter valve 120 can be arranged in the closed configuration to prohibit fluid flow into the meter 110. In the open position of the valve cap 126, the meter valve 120 can be arranged in the open configuration to allow fluid flow in the meter 110.

In some aspects, the drive system 136 can include a toothed drive sprocket 138, which can be driven by a motor 410 (shown in FIG. 4), for example. The toothed drive sprocket 138 can rotationally engage a toothed gear portion 134 of the cap actuator 132 to rotate the cap actuator 132 between the activated and deactivated positions, as described in further detail below. In other aspects, additional gears may be arranged between the toothed drive sprocket 138 and the toothed gear portion 134 to form a gear train. Example aspects of the valve operator 130 can further comprise an operator housing 142. According to example aspects of the valve operator 130, the cap actuator 132 or portions, thereof and/or the drive system 136 or portions thereof can be housed within the operator housing 142. In example aspects, the cap actuator 132 and/or the operator housing 142 can comprise a plastic material. In other aspects, the cap actuator 132 and/or the operator housing 142 can comprise a metal material, such as, for example, brass, iron, or stainless steel. In some aspects, the cap actuator 132 can comprise die cast aluminum or zinc, for example and without limitation. Moreover, in example aspects, the toothed drive sprocket 138 can comprise a metal material. In example aspects, the toothed drive sprocket 138 can be metal injection molded (MIM) or powder sintered pressed metal. In other aspects, the cap actuator 132, the operator housing 142, and/or the toothed drive sprocket 138 can comprise any other suitable material and/or can be manufactured by any suitable method.

The valve operator 130 of the present aspect can further comprise a torque transmission device 150. Other aspects of the valve operator 130 may not comprise the torque transmission device 150, such as the aspect disclosed in FIGS. 11 and 12. In example aspects, rotating the valve cap 126 of the meter valve 120 can require a significant amount of torque. The drive system 136 of the valve operator 130 can provide a suitable amount of torque to the valve cap 126 to rotate the valve cap 126 between the open and closed positions, and the torque can be transferred to opposing box sidewalls 106a,b of the meter box 105 by the torque transmission device 150. The torque transmission device 150 can also aid in holding the cap actuator 132 down on the valve cap 126. In the present aspect, the torque transmission device 150 can comprise a torque bar 152 and opposing feet 154a,b arranged at opposing bar ends of the torque bar 152. The opposing feet 154a,b can be secured to the opposing box sidewalls 106a,b of the meter box 105 by any suitable fastener, including but not limited to, adhesive, such as glue or double-sided tape, screws, nails, sharp teeth configured to grip the opposing box sidewalls 106a,b, or the like.

According to example aspects, the torque transmission device 150 can be adjustable in length to accommodate meter boxes 105 of varying dimensions. Typical meter boxes 105 all comprise substantially flat, opposing box sidewalls 106a,b, regardless of the meter box 105 dimensions, and the feet of the torque transmission device 150 can engage with any suitable flat, opposing box sidewalls 106a,b. Providing the length adjustability feature of the torque transmission device 150 can allow the valve operator 130 to be used with varying sizes of meter boxes 105. In other aspects, however, the length of the torque transmission device 150 may not be adjustable. Additionally, torquing against the opposing box sidewalls 106a,b of the meter box 105 (as opposed to, for example, against the valve body 124 of the meter valve 120) allows for the valve operator 130 to interface only with the valve cap 126. Because the geometry of valve caps 126 are controlled by industry standards, and therefore are typically the same in size and shape across different types of valves, the valve operator 130 can be used with a variety of shapes and sizes of meter valves 120.

Figure 2:
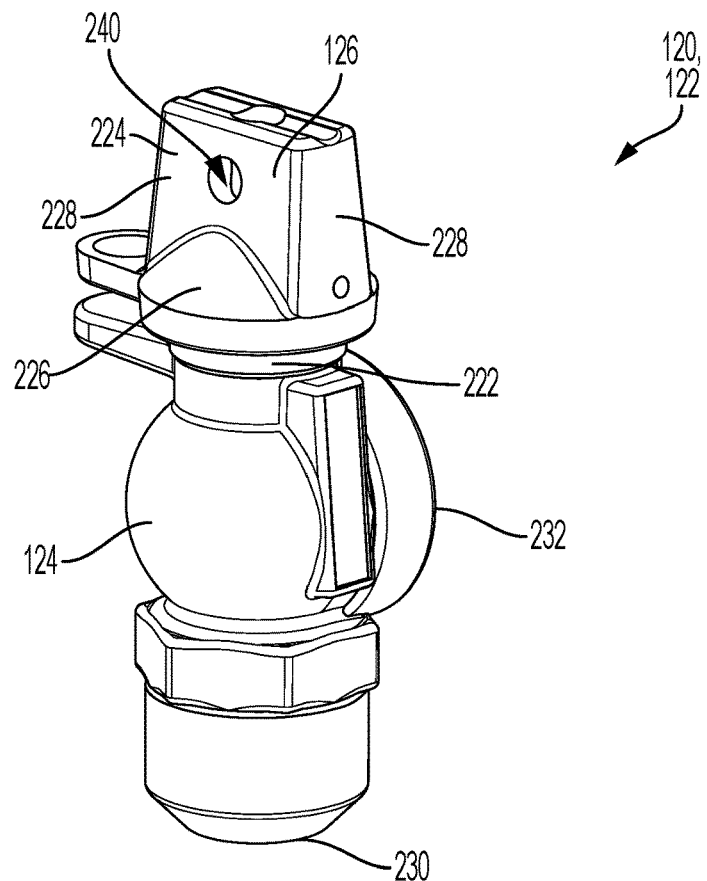
FIG. 2 is a perspective view of the meter valve of FIG. 1.

FIG. 2 illustrates the meter valve 120 according to an example aspect of the present disclosure. In the present aspect, the meter valve 120 can be the ball angle meter valve 122; however, in other aspects, the meter valve 120 can be any other suitable type of valve known in the art. The meter valve 120 can define the valve body 124 and valve cap 126. As shown, the valve cap 126 can be rotationally mounted to the valve body 124 at a top body end 222 of the valve body 124. The valve cap 126 can define a cap flange 224 extending upward from a cap base 226. The cap flange 224 can be substantially rectangular in the present aspect. Additionally, according to example aspects, the cap flange 224 can define a plurality of flange sides 228, and each of the flange sides 228 can taper upward and away from the cap base 226, relative to the orientation shown. The flange sides 228 of the cap flange 224 may be tapered because the valve cap 126 may be formed by casting and require a suitable draft for molding. The tapered flange sides 228 can cause a rising or separating force as torque is applied by the valve operator 130 (shown in FIG. 1) to rotate the valve cap 126 between the open and closed positions. However, the torque transmission device 150 (shown in FIG. 1) can securely attach the valve operator 130 to the valve cap 126 to prevent the cap actuator 132 (shown in FIG. 1) from rising off of the valve cap 126 as the torque is applied. In some aspects, a through-hole 240 can be defined through valve cap 126, as shown. In the present aspect, the through-hole 240 can be defined through the cap flange 224 of the valve cap 126.

The valve body 124 can define a valve inlet end 230 and a valve outlet end 232 opposite the valve inlet end 230. A fluid pathway 510 (shown in FIG. 5) can extend between the valve inlet end 230 and the valve outlet end 232. A ball can be disposed within the fluid pathway 510 of the valve body 124 between the valve inlet end 230 and the valve outlet end 232 and can operatively connected to the valve cap 126. The valve cap 126 can be selectively rotated between the open and closed positions by the valve operator 130 (shown in FIG. 1) to allow or prevent fluid flow therethrough, respectively. In the open position of the valve cap 126, an opening formed through the ball can be aligned with the fluid pathway 510 of the valve body 124 to allow fluid flow therethrough, and in the closed position of the valve cap 126, the opening of the ball can be blocked to prohibit fluid flow therethrough. Various component of the meter valve 120, including the valve cap 126, can be formed from a metal material, such as brass for example and without limitation. In other aspects, the meter valve 120 can comprise any other suitable material or combination of materials, including various metals and plastics.

Figure 3:
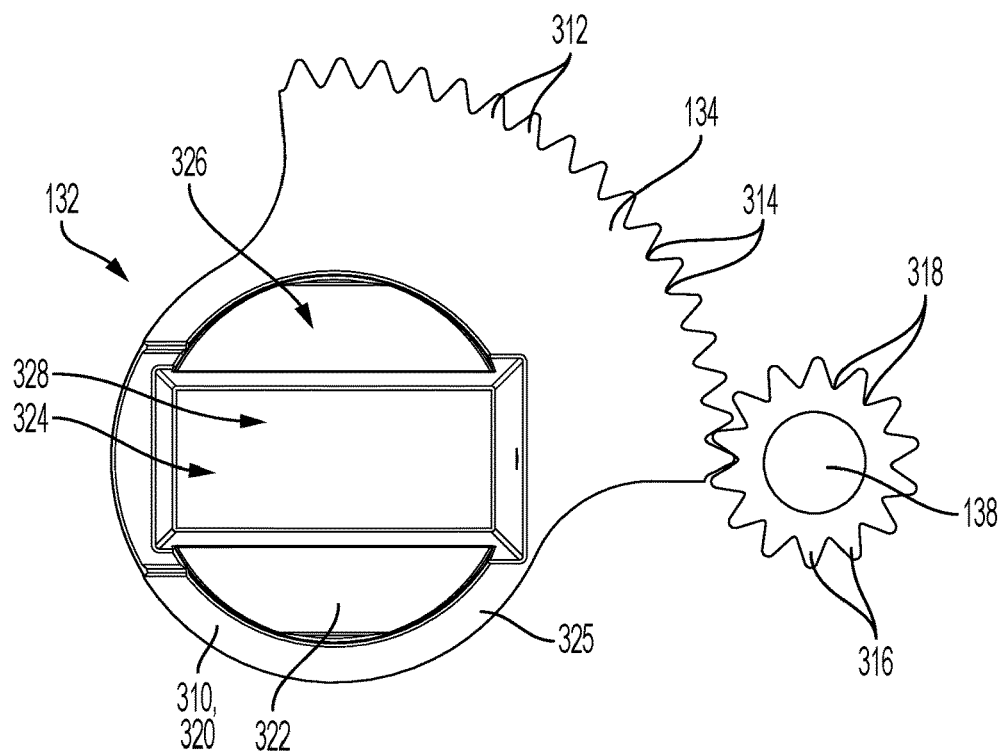
FIG. 3 is a bottom view of a cap actuator and a drive system of the remotely controlled valve operator of FIG. 1.

FIG. 3 illustrates a bottom view of the cap actuator 132 and the toothed drive sprocket 138 of the valve operator 130 (shown in FIG. 1). According to example aspects, the cap actuator 132 can comprise a cap engagement portion 310 configured to engage the valve cap 126 (shown in FIGS. 1 and 2) and the toothed gear portion 134 extending outward from the cap engagement portion 310. The toothed gear portion 134 can be formed monolithically with the cap engagement portion 310 in the present aspect (i.e., formed a singular component that constitutes a single material without joints or seams). In other aspects, the toothed gear portion 134 and the cap engagement portion 310 can be formed separately and coupled together by any suitable fastener, including but not limited to, welding, screws, adhesives, etc.

The toothed gear portion 134 can be substantially arcuate and can extend at least partially about a circumference of the cap engagement portion 310, as shown. The toothed gear portion 134 can define a plurality of outer gear teeth 312, distal to the cap engagement portion 310. A gear tooth gap 314 can be defined between each adjacent pair of outer gear teeth 312. The toothed drive sprocket 138 can be substantially annular and can define a plurality of outer sprocket teeth 316 about a circumference of the toothed drive sprocket 138. A sprocket tooth gap 318 can be defined between each adjacent pair of outer sprocket teeth 316. Each of the outer sprocket teeth 316 can engage a corresponding one of the gear tooth gaps 314 and each of the outer gear teeth 312 can engage a corresponding one of the sprocket tooth gaps 318 as the sprocket is rotated by the motor 410 (shown in FIG. 4) to drive the rotation of the cap actuator 132.

In the present aspect, the cap engagement portion 310 can be formed as a cap cover 320, which can cover and receive at least a portion of the valve cap 126 (shown in FIGS. 1 and 2). An inner engagement surface 322 of the cap engagement portion 310 can define a cap cavity 324 of the cap actuator 132. The cap cavity 324 can extend into the cap engagement portion 310 at a bottom actuator end 325 of the cap engagement portion 310. The cap cavity 324 of the cap actuator 132 can be configured to receive the valve cap 126, or portions thereof, therein. In the present aspect, the cap cavity 324 can define a base cavity portion 326 configured to receive at least a portion of the cap base 226 (shown in FIG. 2) of the valve cap 126 and a flange cavity portion 328 configured to receive the cap flange 224 (shown in FIG. 2) of the valve cap 126. In other aspects, the cap cavity 324 may receive the cap flange 224, or a portion thereof, only.

In some aspects, the cap engagement portion 310 can be secured to the valve cap 126 (shown in FIGS. 1 and 2) by any suitable fastener, including but not limited to, adhesives, screws, bolts, etc. In some aspects, an intermediate material can be arranged between the valve cap 126 and the inner engagement surface 322 of the cap engagement portion 310. For example and without limitation, the intermediate material can be an initially adjustable, but ultimately hard material, capable of transmitting the torque between the valve operator 130 (shown in FIG. 1) and valve cap 126, such as a two-part liquid epoxy, high density spray foam, or two-part clay epoxy. In some aspects, the two-part liquid epoxy or the high density foam spray can be housed inside of a bag that can fill and conform to the space between the valve cap 126 and the inner engagement surface 322 and can then harden. In some aspects, the two-part clay epoxy can be mixed by hand and pressed into the cap cavity 324 of the cap engagement portion 310, and then can be pressed against the valve cap 126 to conform thereto. The cap cavity 324 can thereby accommodate valve caps 126 of varying shapes and/or sizes. In other aspects, the cap cavity 324 can be sized and shaped to receive the valve cap 126, or portions thereof, with minimal clearance therebetween.

Figure 4:
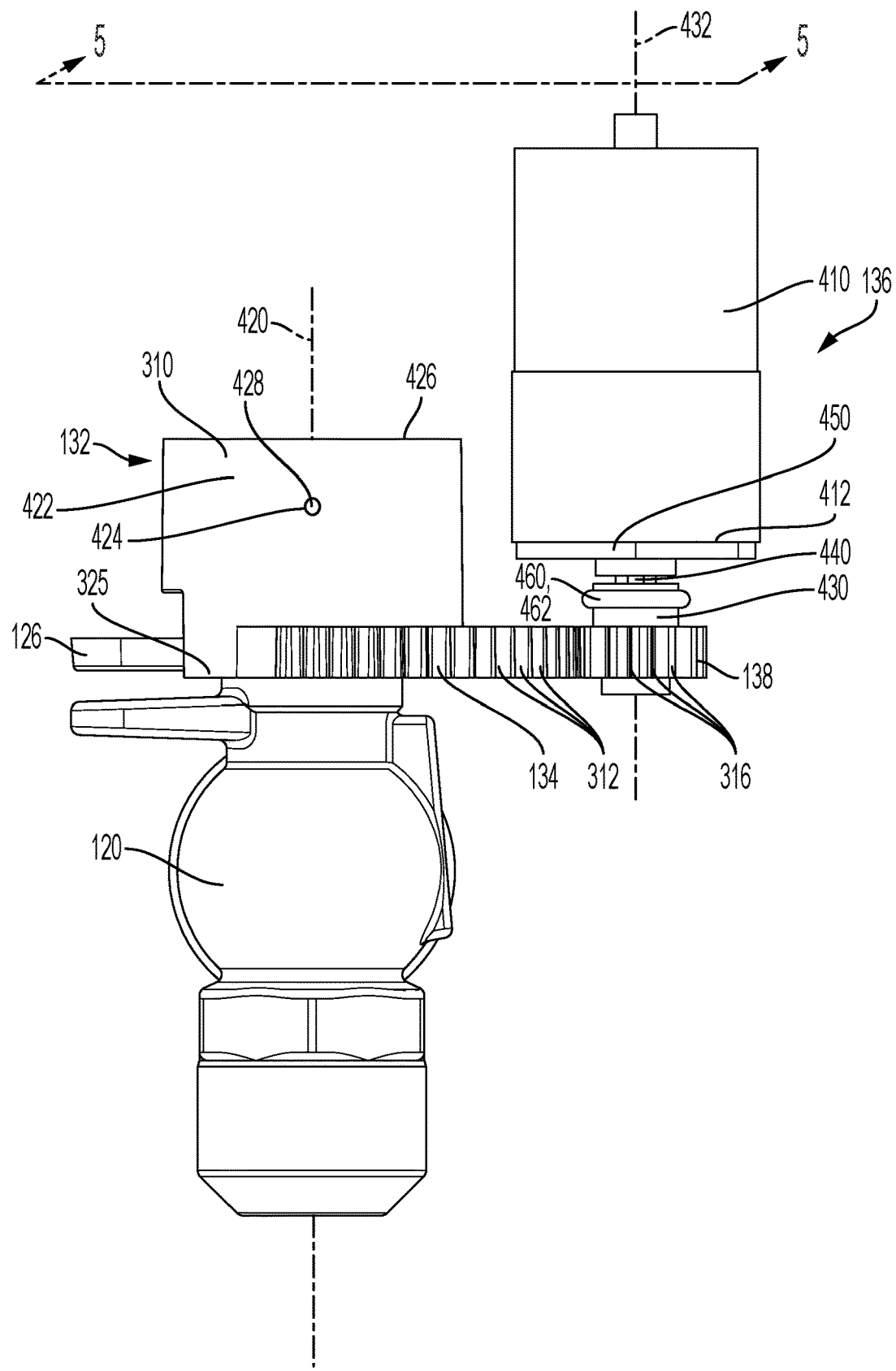
FIG. 4 is a left-side view of the cap actuator and the drive system of FIG. 3 engaged with the meter valve of FIG. 1.

FIG. 4 illustrates the cap engagement portion 310 of the cap actuator 132 coupled to the valve cap 126 of the meter valve 120. FIG. 4 also illustrates the drive system 136 operatively engaged with the toothed gear portion 134 of the cap actuator 132. The cap base 226 (shown in FIG. 2) and the cap flange 224 (shown in FIG. 2) of the valve cap 126 can be substantially received within the cap cavity 324 (shown in FIG. 3) of the cap engagement portion 310. The toothed gear portion 134 of the cap actuator 132 can extend substantially radially outward from the cap engagement portion 310, relative to a cavity axis 420 extending through the cap cavity 324 of the cap actuator 132. The toothed gear portion 134 can extend from an outer actuator sidewall 422 of the cap actuator 132, proximate to the bottom actuator end 325 of the cap actuator 132, opposite a top actuator end 426 thereof. In other aspects, the toothed gear portion 134 can be arranged elsewhere along the cap actuator 132 between the top actuator end 426 and the bottom actuator end 325. The outer gear teeth 312 of the toothed gear portion 134 can matingly engage the toothed drive sprocket 138, and the outer sprocket teeth 316 of the toothed drive sprocket 138 can matingly engage the toothed gear portion 134, as previously described. In some aspects, a fastener hole, such as a pin hole 424, can extend laterally through the outer actuator sidewall 422 of the cap engagement portion 310. The pin hole 424 can be aligned with the through-hole 240 (shown in FIG. 2), and a pin 428 or other suitable fastener can extend through each of the pin hole 424 and the through-hole 240 to pin the cap engagement portion 310 to the valve cap 126.

Example aspects of the drive system 136 can comprise at least the toothed drive sprocket 138 and the motor 410 for driving the rotation of the toothed drive sprocket 138. According to example aspects, a substantially annular sprocket flange 430 can extend axially from a center of the substantially annular toothed drive sprocket 138, relative to a sprocket axis 432 extending through the center of the toothed drive sprocket 138. As shown, a drive stem 440 can extend from and be rotationally driven by the motor 410. The drive stem 440 can engage a stem opening 520 (shown in FIG. 5) extending axially into the sprocket flange 430, relative to the sprocket axis 432, to operatively couple the motor 410 to the toothed drive sprocket 138. In some aspects, each of the drive stem 440 and the stem opening 520 of the sprocket flange 430 can define a cross-sectional shape of a truncated circle, for example and without limitation. In other aspects, the cross-sectional shape of the drive stem 440 and stem opening 520 can be rectangular, triangular, semi-circular, or any other suitable shape.

The drive stem 440 can be rotationally driven by the motor 410 about the sprocket axis 432, which in turn can rotate the toothed drive sprocket 138 about the sprocket axis 432. In example aspects, power can be provided to the motor 410 by a power source, such as batteries 1210 (shown in FIG. 12) or solar power, for example and without limitation. The engagement of the toothed drive sprocket 138 with the toothed gear portion 134 of the cap actuator 132 can rotate the cap actuator 132 about the cavity axis 420 of the cap actuator 132 as the toothed drive sprocket 138 is rotated. The cap engagement portion 310 of the cap actuator 132 can be mounted to the valve cap 126 of the meter valve 120, and the valve cap 126 can be rotated between the open and closed positions as the cap actuator 132 is rotated. In example aspects, the motor 410 can be selectively driven in both a forward direction and a reverse direction to allow the valve cap 126 to be rotated in a first direction to the open position and an opposite second direction to the closed position. In example aspects, the valve cap 126 can be rotated about 90° in the first direction to the open position and about 90° in the second direction to the closed position. In example aspects, the valve cap 126 can further be rotated to any number of intermediate positions between the open and closed positions to selectively increase or decrease the flow of fluid through the meter valve 120.

In example aspects, a motor plate 450 can be mounted to a bottom motor end 412 of the motor 410. The drive stem 440 can extend through a plate opening 530 (shown in FIG. 5) formed through the motor plate 450. The motor plate 450 can transmit toque from the motor 410 to the operator housing 142 (shown in FIG. 1), as described in further detail below. Moreover, in the present aspect, a packing 460, such as an O-ring 462, can be mounted to the sprocket flange 430. The O-ring 462 can interface with the operator housing 142 to create a fluid-tight seal between the operator housing 142 and the sprocket flange 430, to protect the motor 410 housed within the operator housing 142 from moisture and other undesirable elements.

Figure 5:
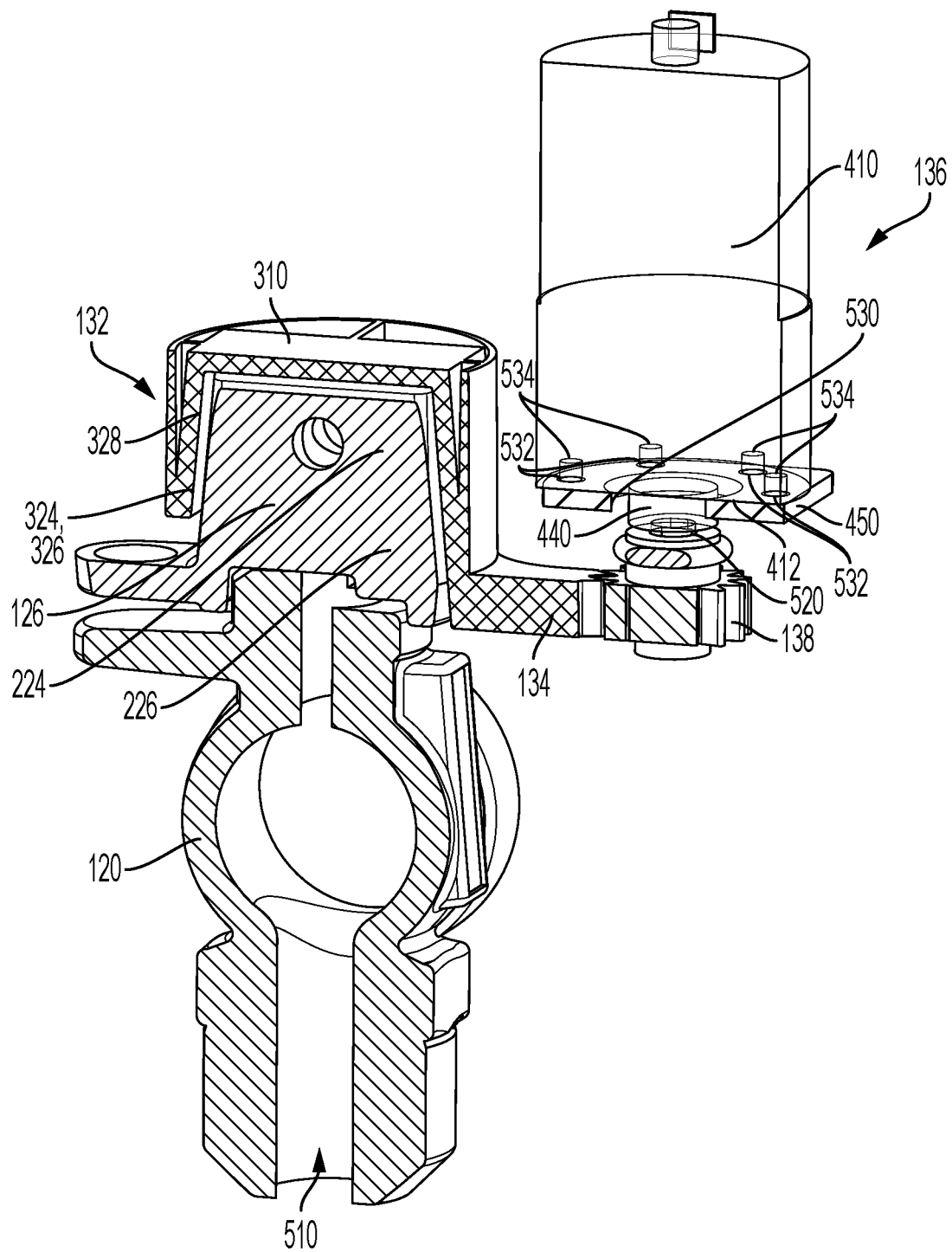
FIG. 5 is a cross-sectional view taken along line 5-5 in FIG. 4.

FIG. 5 illustrates a cross-sectional view of the cap actuator 132 and the drive system 136 of valve operator 130 (shown in FIG. 1) mounted to the meter valve 120, taken along line 5-5 in FIG. 4. As shown, the cap engagement portion 310 of the cap actuator 132 can engage the valve cap 126 of the meter valve 120. More specifically, in the present aspect, the cap base 226 of the valve cap 126 of the meter valve 120 can be at least partially received within the base cavity portion 326 of the cap cavity 324, and the cap flange 224 can be received within the flange cavity portion 328 of the cap cavity 324. As previously described, the drive system 136 can actuate the cap actuator 132, which in turn can drive the rotation of the valve cap 126 between the open and closed positions. More specifically, the toothed drive sprocket 138 of the drive system 136 can engage the toothed gear portion 134 of the cap actuator 132 as previously described. The drive stem 440 can be operatively connected to the toothed drive sprocket 138 and can be rotationally driven by the motor 410 of the drive system 136. Rotating the drive stem 440 can thereby rotate the toothed drive sprocket 138, which can in turn rotate the cap actuator 132, which can in turn rotate the valve cap 126 of the meter valve 120 between the open and closed positions.

The motor 410 and drive stem 440 are illustrated as transparent in the present aspect to allow visibility of the motor plate 450 mounted to the motor 410 at the bottom motor end 412 of the motor 410. As shown, the motor plate 450 can define a plurality of plate mounting holes 532, each of which can be aligned with a corresponding motor mounting hole 534 formed in the motor 410. A fastener, such a screw or bolt for example and without limitation, can engage each corresponding pair of plate mounting holes 532 and motor mounting holes 534 to couple the motor plate 450 to the motor 410.

Figure 6:
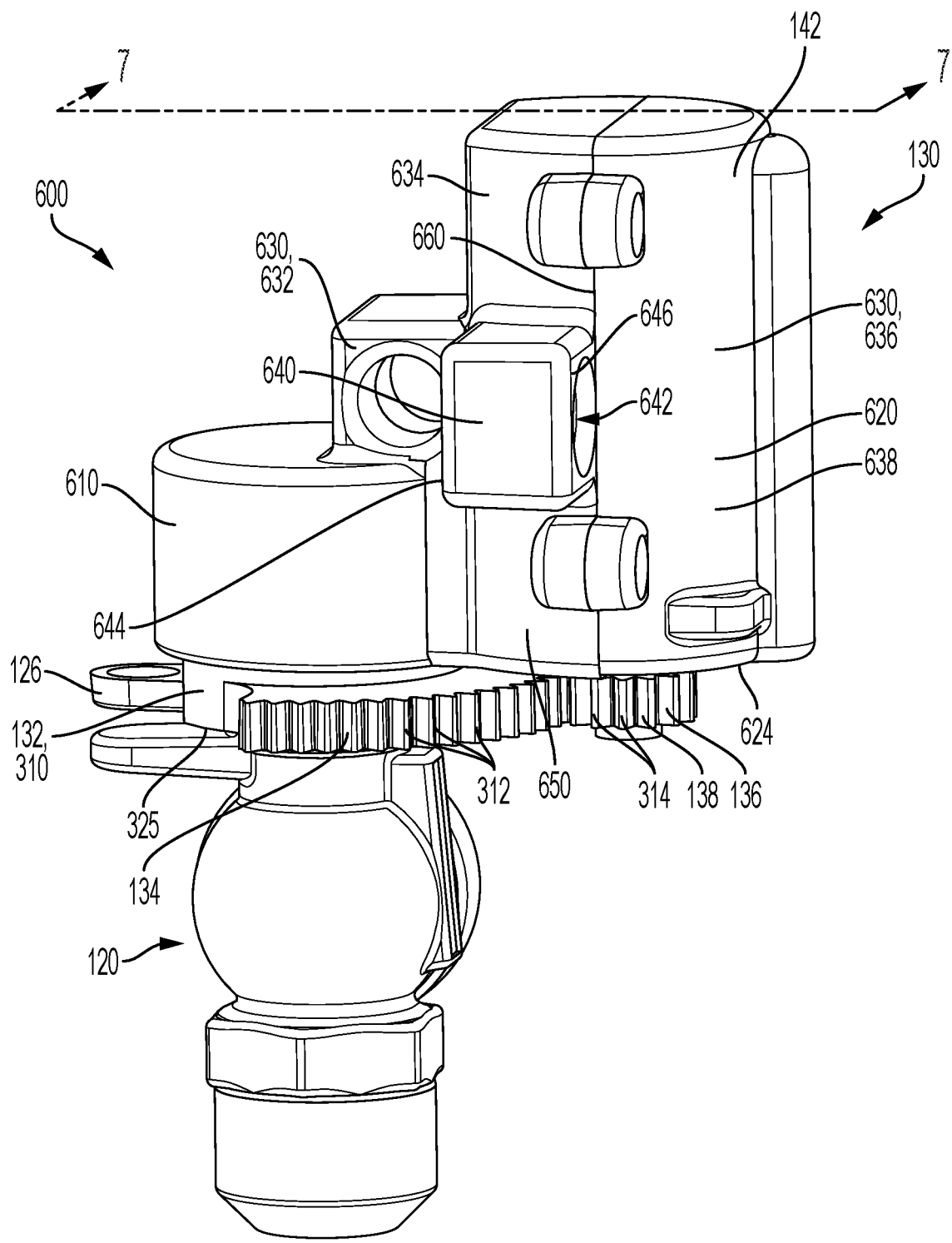
FIG. 6 is a left-side perspective view of an operator housing of the remotely controlled valve operator of FIG. 1.
Figure 7:
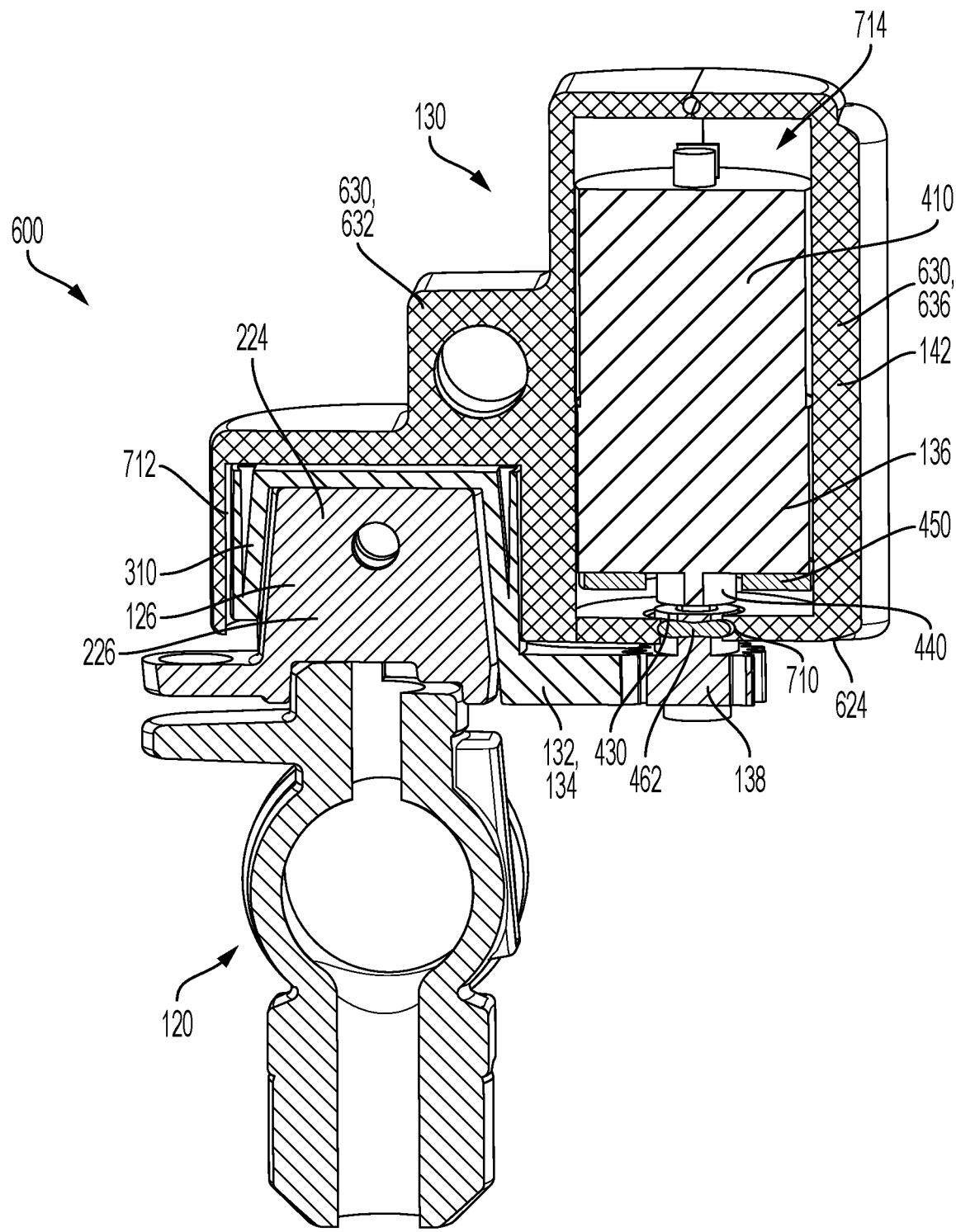
FIG. 7 is a cross-sectional view taken along line 7-7 in FIG. 6.

FIGS. 6 and 7 illustrate a remotely controlled valve assembly 600 comprising the meter valve 120 and the valve operator 130. FIG. 6 illustrates the full valve operator 130 mounted to the valve cap 126 of the meter valve 120, and FIG. 7 illustrates a cross-sectional view taken along line 7-7 in FIG. 6. As shown, the valve operator 130 comprises the operator housing 142, which can at least partially house the drive system 136 and the cap actuator 132. For example, in the present aspect, the operator housing 142 can comprise an actuator housing portion 610 for at least partially housing the cap actuator 132 and a drive housing portion 620 for at least partially housing the drive system 136. As shown, the actuator housing portion 610 can define an actuator housing cavity 712 (shown in FIG. 7) that can house a portion of the cap engagement portion 310 of the cap actuator 132, including the cap flange 224 (shown in FIG. 7) and at least a portion of the cap base 226 (shown in FIG. 7). However, the toothed gear portion 134, including the outer gear teeth 312, and the bottom actuator end 325 of the cap engagement portion 310 can be arranged external to the actuator housing portion 610.

The drive housing portion 620 of the operator housing 142 can define a drive housing cavity 714 (shown in FIG. 7) that can at least partially house the drive system 136. More specifically, in the present aspect, the drive housing portion 620 can house the motor 410 (shown in FIG. 7), the motor plate 450 (shown in FIG. 7), the drive stem 440 (shown in FIG. 7), and a portion of the toothed drive sprocket 138. Specifically, the sprocket flange 430 (shown in FIG. 7) of the toothed drive sprocket 138 can extend into the drive housing portion 620 through a housing opening 710 (shown in FIG. 7) formed at a bottom housing end 624 of the drive housing portion 620. The O-ring 462 (shown in FIG. 7) mounted on the sprocket flange 430 can be arranged within the housing opening 710 to form a fluid-tight seal between the sprocket flange 430 and the drive housing portion 620, thereby preventing moisture and other undesirable elements from entering the drive housing cavity 714. However, the outer sprocket teeth 316 (shown in FIG. 3) of the toothed drive sprocket 138 can be arranged external to the drive housing portion 620, as shown. The outer sprocket teeth 316 of the toothed drive sprocket 138 can thereby engage the outer gear teeth 312 of the toothed gear portion 134 external to the operator housing 142. In other aspects, however, the toothed drive sprocket 138 and/or the toothed gear portion 134 may be housed within the operator housing 142. In the cross-sectional view of FIG. 7, the interior of the motor 410 is illustrated as solid for the sake of simplicity; however, various electronic components can be housed therein for driving the motor 410.

In some aspects, the operator housing 142 can comprise multiple housing segments 630 that can be formed separately and assembled together. In other aspects, the operator housing 142 can be monolithically formed. In the present aspect, the operator can comprise two of the housing segments 630. A first housing segment 632 of the two housing segments 630 can comprise the actuator housing portion 610 and a first portion 634 of the drive housing portion 620. A second housing segment 636 can comprise a second portion 638 of the drive housing portion 620. The first housing segment 632 can be joined to the second housing segment 636 as a seam 660, as shown. The first housing segment 632 can be coupled to the second housing segment 636 by any suitable fasteners or fastening techniques, including welding, adhesives, bolts, screws, and the like.

Additionally, the operator housing 142 can define a mounting bracket 640 for mounting the torque transmission device 150 (shown in FIG. 1) to the valve operator 130. In example aspects, the mounting bracket 640 can extend outward from an outer housing surface 650 of the drive housing portion 620. In other aspects, the mounting bracket 640 can be positioned elsewhere on the operator housing 142. The mounting bracket 640 can define a bar opening 642 extending therethrough from a first bracket side 644 of the mounting bracket 640 to a second bracket side 646 of the mounting bracket 640. The torque bar 152 (shown in FIG. 1)

of the torque transmission device 150 can be configured to extend through the bar opening 642 of the mounting bracket 640, as illustrated in FIG. 1.

The actuation of the valve operator 130 can be remotely controlled. Example aspects of the valve operator 130 can comprise a controller for operating the motor 410 (shown in FIG. 7) of the drive system 136 and for selectively changing the direction of the motor 410 between the forward and reverse directions. The controller can be completely wireless or can be wired to various components of the valve operator 130, such as the motor 410. The controller can allow an external operator, such as a human operator or a computer, to remotely control the operation of the meter valve 120, i.e., to remotely control the selective orientation of the valve cap 126 in the closed, open, or intermediate positions by actuating the valve operator 130. The controller can be remotely controlled from a remote operation device, such as a mobile phone, tablet, computer, or the like, which can be wirelessly connected to the controller. In example aspects, a program or app can be downloaded onto the remote operation device, through which the operator can wirelessly send control signals to the controller, and the controller can actuate the valve operator 130 in response to the control signals. Thus, the meter valve 120 does not need to be physically accessed by a human operator in order to be selectively configured in the open or closed configuration. In some aspects, the controller can be a Bluetooth® controller. In other aspects, any other suitable wireless communication technique(s) may be implemented for remotely controlling the valve operator 130 with the remote operation device and controller.

In some example aspects, the valve operator 130 can further comprise any or all of a time controller and/or microprocessor, integral communications (e.g., cellular node, radio, short wave, LPWAN), and/or a wifi or Bluetooth antenna. In some example aspects, the valve operator 130 can further comprise end limit switches, optical isolators, indicator lights, and or physical indicators for visually indicating the position of the valve cap 126 (e.g., open, closed, or any number of intermediate positions). For example and without limitation, such a physical indicator could include a molded plastic "ON" that appears in a window when the meter valve 120 is in the fully open configuration and a molded plastic "OFF" that appears in the window when the meter valve 120 is in the fully closed configuration.

Figure 8:
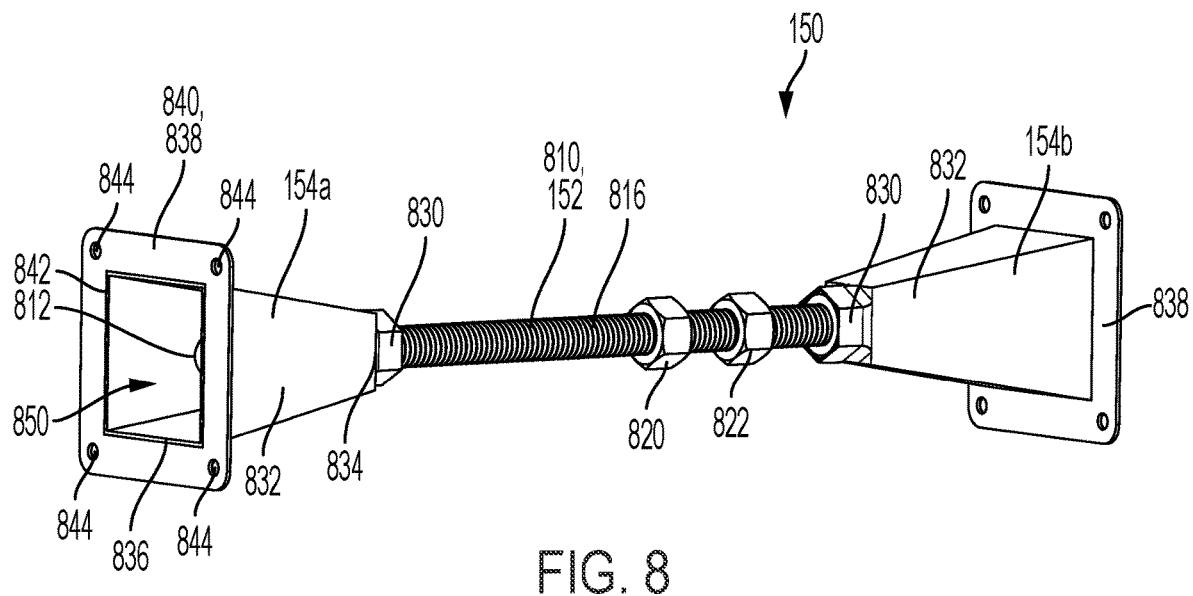
FIG. 8 is a perspective view of a torque transmission device of the remotely controlled valve operator of FIG. 1.
Figure 9:
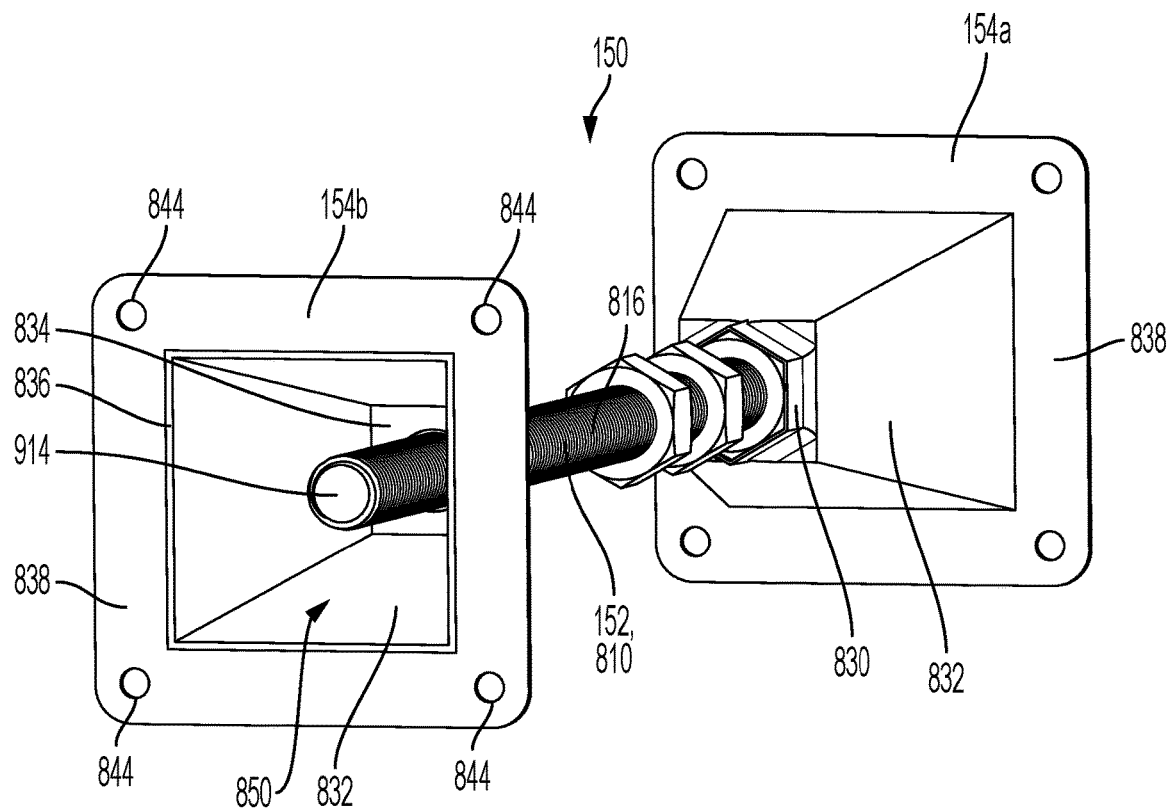
FIG. 9 is a perspective view of the torque transmission device of FIG. 8.

FIGS. 8 and 9 illustrate perspective views of the torque transmission device 150. The torque transmission device 150 can comprise the torque bar 152 and the two opposing feet 154*a,b* mounted to the torque bar 152. In example aspects, the torque bar 152 can comprise an elongate threaded rod 810. The threaded rod 810 can define a first rod end 812 and a second rod end 914 (shown in FIG. 9) opposite the first opposing end. A first foot 154*a* of the two opposing feet 154*a,b* can be mounted to the threaded rod 810 proximate to the first rod end 812, and the second foot 154*b* of the two opposing feet 154*a,b* can be mounted to the threaded rod 810 proximate to the second rod end 914. The threaded rod 810 can define a central rod section 816 between the first foot 154*a* and the second foot 154*b*, and the central rod section 816 can extend through the bar opening 642 (shown in FIG. 6) of the mounting bracket 640 (shown in FIG. 6) of the valve operator 130 (shown in FIG. 1).

In example aspects, a first positioning nut 820 and a second positioning nut 822 can be mounted to the central rod section 816 of the threaded rod 810. Each of the first positioning nut 820 and the second positioning nut 822 can be hex nuts in the present aspect; however, in other aspects, the first and second positioning nuts 820,822 can be any other suitable type of nut. The first positioning nut 820 can be tightened against the first bracket side 644 (shown in FIG. 6) of the mounting bracket 640 (shown in FIG. 6) and the second positioning nut 822 can be tightened against the second bracket side 646 (shown in FIG. 6) of the mounting bracket 640 to securely couple the threaded rod 810 to the mounting bracket 640 at a desired position along the central rod section 816. Prior to tightening the first and second positioning nuts 820,822, the central rod section 816 of the threaded rod 810 can be slid back and forth laterally within the bar opening 642 (shown in FIG. 6) to position the mounting bracket 640 at the desired position along the central rod section 816.

According to example aspects, each of the first foot 154*a* and the second foot 154*b* can define a rod fastener 830, a body portion 832, and a wall bracket 838. The rod fastener 830 can be positioned at a proximal end 834 of the body portion 832, and the wall bracket 838 can be positioned at a distal end 836 of the body portion 832. In the present aspect, the body portion 832 can define the shape of a truncated square pyramid. The proximal end 834 of the body portion 832 can be the truncated end, as shown. In other aspects, the first foot 154*a* and/or the second foot 154*b* can define any other suitable shape.

The rod fastener 830 can be arranged adjacent to the central rod section 816 and can couple the corresponding first foot 154*a* or second foot 154*b* to the threaded rod 810. The rod fastener 830 can define a threaded bore 1010 (shown in FIG. 10), and the threaded rod 810 can rotationally engage the threaded bore 1010. As shown, in example aspects, the first rod end 812 and the second rod end 914 (shown in FIG. 9) can extend through the threaded bore 1010 of the corresponding rod fastener 830 and into a foot cavity 850 defined by the corresponding body portion 832. The first foot 154*a* and/or second foot 154*b* can be rotated on the threaded rod 810 towards or away from the central rod section 816 to decrease or increase the length of the torque transmission device 150, respectively. The length of the torque transmission device 150 can thereby be selectively adjusted to accommodate meter boxes 105 (shown in FIG. 1) of varying dimensions.

The wall bracket 838 can be formed as a substantially planar plate 840 at the distal end 836 of the corresponding first foot 154*a* or second foot 154*b*. The wall bracket 838 can be substantially square shaped in the present aspect, and can define a central cavity opening 842 allowing access to the foot cavity 850. In other aspects, the wall bracket 838 can define any other suitable shape and/or may not define the central cavity opening 842. Example aspects of the wall bracket 838 can comprise one or more bracket fastener openings 844. The wall bracket 838 of the opposing feet 154*a,b* can be arranged to lie substantially flat against the opposing box sidewalls 106*a,b* (shown in FIG. 1) of the meter box 105. A bracket fastener can extend through each of the bracket fastener openings 844 and can engage the corresponding box sidewall 106*a,b* to attach the opposing feet 154*a,b* to the opposing box sidewalls 106*a,b*. Prior to attaching the opposing feet 154*a,b* to the opposing box sidewalls 106*a,b*, the opposing feet 154*a,b* can be readjusted as needed along the length of the threaded rod 810, as previously described, to properly abut the corresponding wall bracket 838 against the corresponding box sidewall 106*a,b*.

Figure 10:
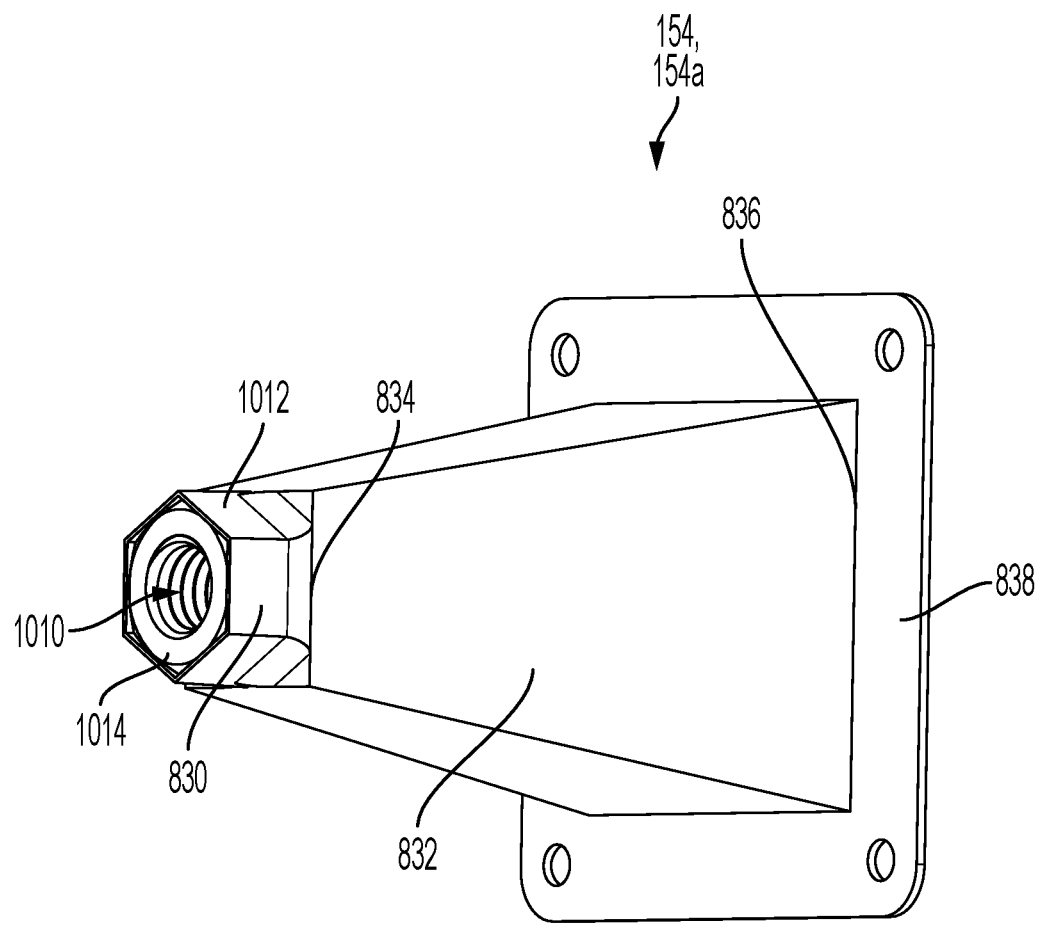
FIG. 10 is a perspective view of a foot of the torque transmission device of FIG. 9.

FIG. 10 illustrates a perspective view of the one of the opposing feet 154 of the torque transmission device 150 (shown in FIG. 1). For example, the first foot 154*a* is shown in the present view, which can be substantially the same as the second foot 154*b* (shown in FIG. 1). As shown, the rod fastener 830 can be arranged at the proximal end 834 of the body portion 832 of the first foot 154*a*, and the wall bracket 838 can be arranged at the distal end 836 of the body portion 832. In the present aspect, the rod fastener 830 can comprise a tube portion 1012 formed monolithically with the body portion 832 and the wall bracket 838. The rod fastener 830 can further comprise a fastener nut 1014 mounted within the tube portion 1012. In example aspects, the tube portion 1012 can be substantially hexagonal and the fastener nut 1014 can be a hex nut, similar to or the same as the first and second positioning nuts 820,822 (shown in FIG. 8). In other aspects, the fastener nut 1014 can be any other suitable type of nut. The fastener nut 1014 can be retained within the tube portion 1012 of the rod fastener 830 by friction fit or by any suitable fastening device or technique, including adhesives, welding, rivets, and the like. As shown, the fastener nut 1014 can define the threaded bore 1010 configured to rotationally receive to the threaded rod 810 (shown in FIG. 8) therethrough.

Figure 11:
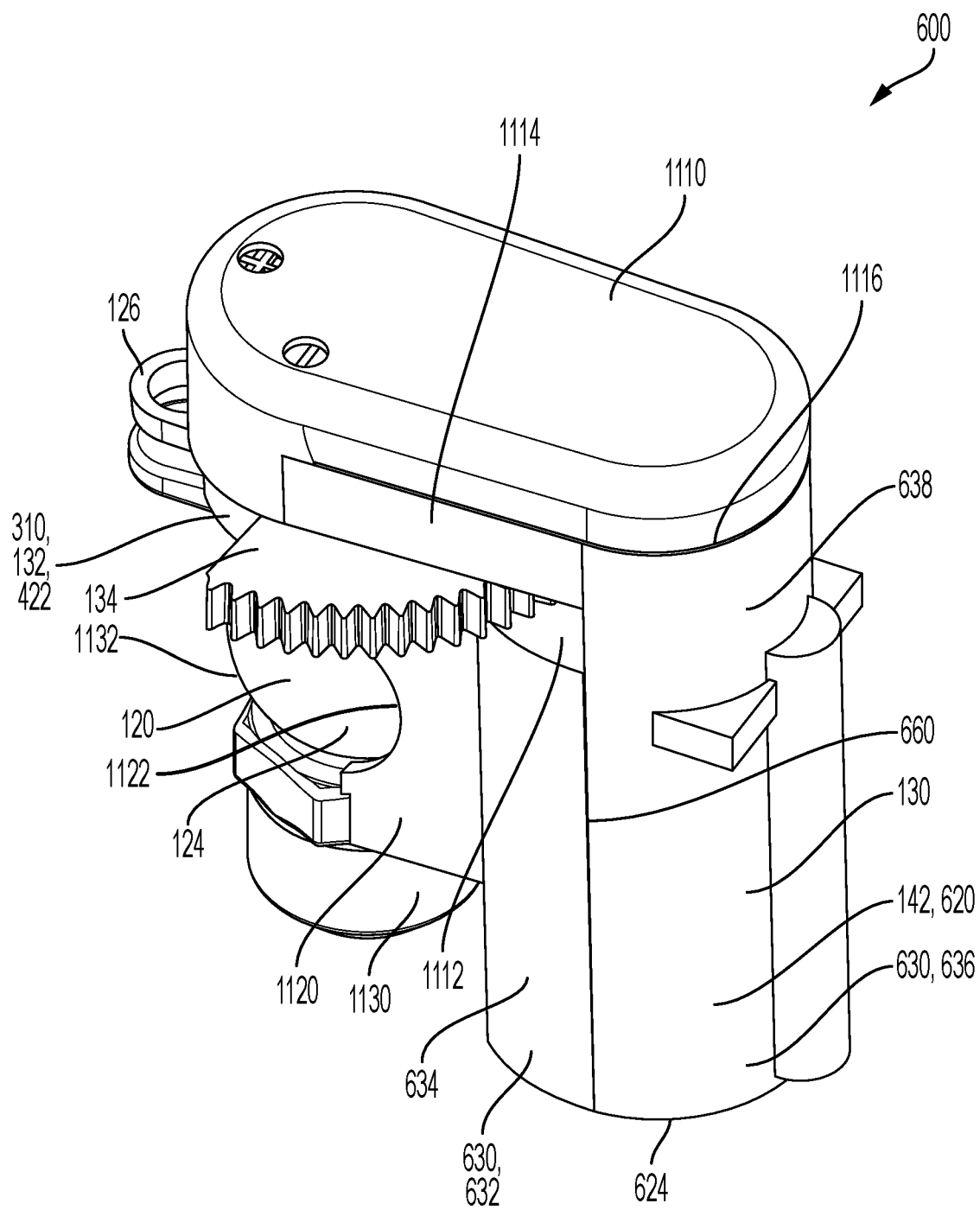
FIG. 11 is a left-side perspective view of a valve assembly comprising the meter valve and the remotely controlled valve operator, in accordance with another aspect of the present disclosure.
Figure 12:
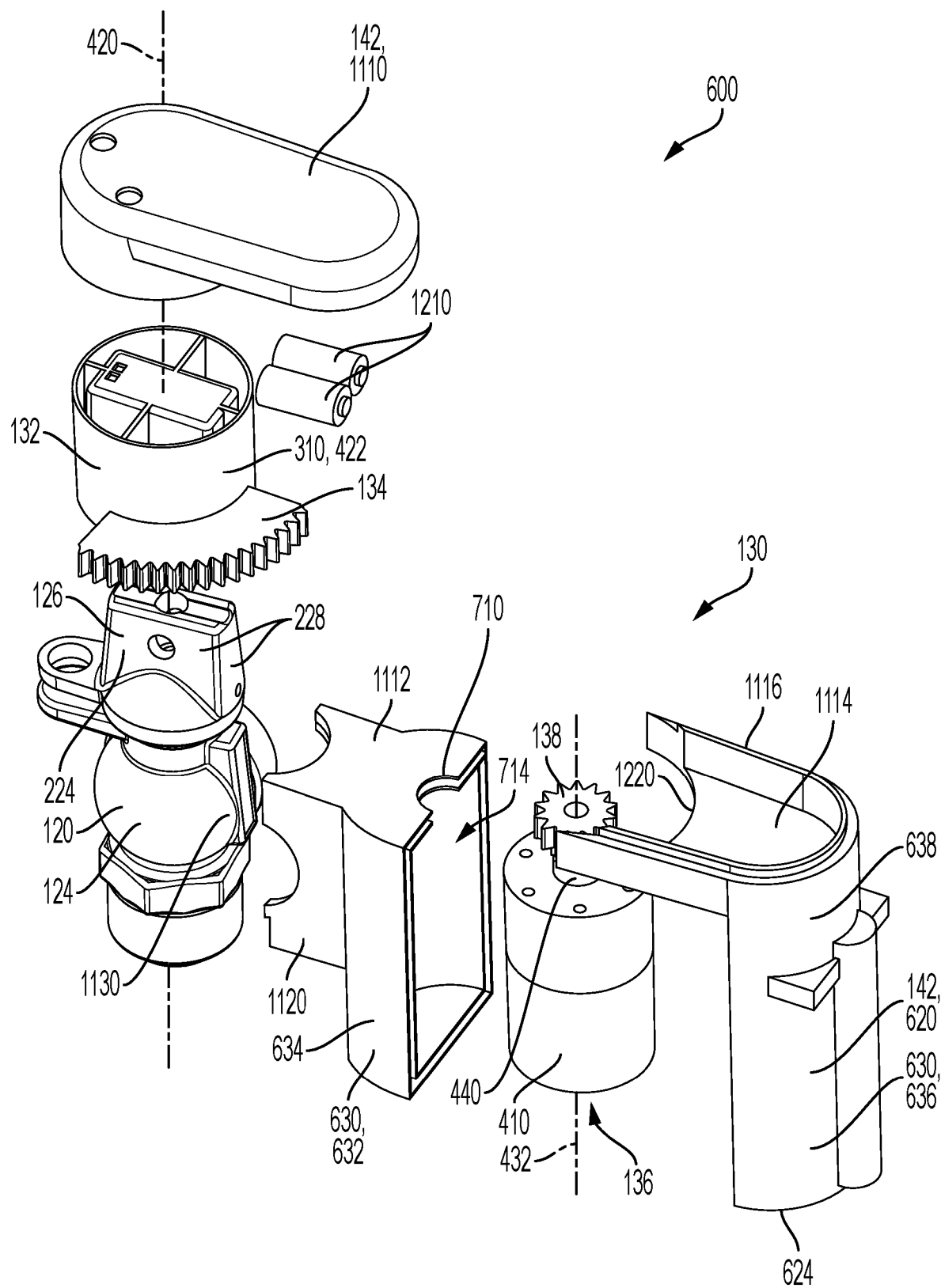
FIG. 12 is an exploded view of the valve assembly of FIG. 11.

FIGS. 11 and 12 illustrate perspective and exploded views respectively of the valve assembly 600 according to another example aspect of the present disclosure. The valve assembly 600 can comprise the meter valve 120 and the valve operator 130. The meter valve 120 can be substantially the same as the meter valve 120 of the previous aspect. However, various features of the valve operator 130 can differ from valve operator 130 of the previous aspect, as described in further detail below. The valve operator 130 of the present aspect can be mounted to the valve cap 126 of the meter valve 120 and can be remotely controlled to actuate the valve cap 126 between the open and closed positions, and to thereby actuate the meter valve 120 between the open and closed configurations, respectively. Similar to the valve operator 130 of FIGS. 1-10, the valve operator 130 of the present aspect can comprise the cap actuator 132 configured to actuate the valve cap 126 of the meter valve 120 and the drive system 136 (shown in FIG. 12) configured to drive the cap actuator 132 between the activated and deactivated positions.

The cap actuator 132 can comprise the cap engagement portion 310 and the toothed gear portion 134. The drive system 136 can comprise the motor 410 (shown in FIG. 12), the drive stem 440 (shown in FIG. 12), and the toothed drive sprocket 138 (shown in FIG. 12). The valve operator 130 can comprise the operator housing 142, which in the present aspect does not include the actuator housing portion 610 (shown in FIG. 6). Rather, the operator housing 142 of the present aspect can comprise the drive housing portion 620 and can further comprise a housing lid 1110. The housing lid 1110 can couple the drive housing portion 620 of the operator housing 142 to the cap actuator 132, and further can prevent the cap actuator 132 from rising off of the valve cap 126 as the torque is applied, as described in further detail below. The motor 410 and at least a portion of the drive stem 440 can be housed within the drive housing portion 620. In some aspects, the toothed drive sprocket 138 can comprise the sprocket flange 430 (shown in FIG. 4), and the drive stem 440 can engage the sprocket flange 430 as previously described. The sprocket flange 430 can extend into the drive housing cavity 714 (shown in FIG. 12) of the drive housing portion 620 through the housing opening 710 (shown in FIG. 12). The housing opening 710 can be formed through an inner housing shelf 1112 of the drive housing portion 620. The inner housing shelf 1112 can be positioned proximate to a top housing end 1116 of the drive housing portion 620. The top housing end 1116 of the drive housing portion 620 can be arranged opposite the bottom housing end 624 thereof.

The power source (e.g., the batteries 1210, shown in FIG. 12) of the drive system 136 (shown in FIG. 12) can be housed within either the housing lid 1110 of the operator housing 142 or the drive housing portion 620 of the operator housing 142. In the present aspect, the drive housing portion 620 can comprise an outer housing shelf 1114 configured to extend over top of the toothed drive sprocket 138 (shown in FIG. 12) at the top housing end 1116. The outer housing shelf 1114 can be configured to support the housing lid 1110 thereon. In the present aspect, the toothed drive sprocket 138 can be arranged external to the drive housing cavity 714 (shown in FIG. 12) of the drive housing portion 620 and positioned laterally between the outer housing shelf 1114 and the inner housing shelf 1112. In example aspects, the outer housing shelf 1114 can define an arcuate indentation 1220 (shown in FIG. 12) that can be configured to accommodate a portion of the outer actuator sidewall 422 of the cap actuator 132.

According to example aspects, the drive housing portion 620 can comprise the two housing segments 630. The first housing segment 632 can be joined to the second housing segment 636 at the seam 660, as shown. The first housing segment 632 can be coupled to the second housing segment 636 by any suitable fasteners or fastening techniques, including welding, adhesives, bolts, screws, and the like. In example aspects, the first housing segment 632 can comprise the first portion 634 of the drive housing portion 620, which can include at least a portion of the inner housing shelf 1112 in some aspects. The first housing segment 632 can further comprise a body engagement portion 1120 configured to engage the valve body 124 of the meter valve 120 at a first valve side 1130 thereof. The body engagement portion 1120 can define a concave pocket 1122 that can fit snugly against the first valve side 1130, as shown. In some aspects, the body engagement portion 1120 (or the entire first housing segment 632) can be interchangeable with other body engagement portions 1120 of varying shapes to accommodate different types and sizes of meter valves 120. The body engagement portion 1120 is described in further detail below. The second housing segment 636 can comprise the second portion 638 of the drive housing portion 620, which can include at least a portion of the outer housing shelf 1114 in some aspects.

The valve cap 126 of the meter valve 120 can be actuated between the open and closed positions as previously described. That is, the drive stem 440 (shown in FIG. 12) can be rotationally driven by the motor 410 (shown in FIG. 12) about the sprocket axis 432 (shown in FIG. 12), which in turn can rotate the toothed drive sprocket 138 (shown in FIG. 12) about the sprocket axis 432. Power can be provided to the motor 410 by the power source, such as the batteries 1210. The engagement of the toothed drive sprocket 138 with the toothed gear portion 134 of the cap actuator 132 can rotate the cap actuator 132 about the cavity axis 420 (shown in FIG. 12) of the cap actuator 132 as the toothed drive sprocket 138 is rotated. The cap engagement portion 310 of the cap actuator 132 can be mounted to the valve cap 126 of the meter valve 120, and the valve cap 126 can be rotated between the open and closed positions as the cap actuator 132 is rotated.

In the present aspect, the valve operator 130 does not comprise the torque transmission device 150 previously described. Rather, the body engagement portion 1120 of the operator housing 142 can engage the first valve side 1130 of the valve body 124 of the meter valve 120, as shown in FIG. 11. In some aspects, the body engagement portion 1120 can be secured in place against the first valve side 1130 of the valve body 124 by a fastening device of the valve operator 130, such as, for example and without limitation, a strap, bolt, U-clamp, hose clamp, or the like. In some aspects, the body engagement portion 1120 can extend around the valve body 124 and can define an opposing concave pocket (opposite the concave pocket 1122) configured to snugly fit against a second valve side 1132 (opposite the first valve side 1130) of the valve body 124. The fastening device can encircle the valve body 124 to secure the operator housing 142 thereto. In other aspects, however, the fastening device can comprise any other suitable fasteners or fastening techniques known in the art, including but not limited to, welding, adhesives, bolts, screws, and the like.

As previously described, example aspects of the cap flange 224 (shown in FIG. 12) of the valve cap 126 can be tapered on each of the flange sides 228 (shown in FIG. 12). The flange sides 228 may be tapered because the valve cap 126 maybe formed by casting and require draft for molding. The tapered flange sides 228 can cause a rising or separating force as torque is applied by the valve operator 130 to rotate the valve cap 126 between the open and closed positions. However, the secure attachment of the body engagement portion 1120 to the valve body 124 can prevent the cap engagement portion 310 of the cap actuator 132 from rising off of the valve cap 126 as the torque is applied.

In example aspects, a method of assembling the valve assembly 600 of FIGS. 11 and 12 can comprise placing the cap engagement portion 310 onto the valve cap 126 with the cap flange 224 of the valve cap 126 engaging the flange cavity portion 328 (shown in FIG. 3) of the cap engagement portion 310. In the present aspect, the valve cap 126 may not be pinned to the cap engagement portion 310. The drive housing portion 620 and motor 410 can then be slid towards the meter valve 120 from the side and the clamp can be tightened. The cap actuator 132 can be prevented from rising off the valve cap 126 because the toothed gear portion 134 of the cap actuator 132 can be constrained between the inner housing shelf 1112 and the outer housing shelf 1114. The housing lid 1110 can then be glued, or otherwise affixed, to the top housing end 1116 of the drive housing portion 620.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A remotely controlled valve operator comprising:
   a cap actuator comprising a cap engagement portion and a toothed gear portion, the cap engagement portion configured to operatively engage a valve cap of a valve; and
   a drive system comprising a motor and a sprocket, the motor remotely controlled by a controller and configured to drive rotation of the sprocket, the sprocket engaging the toothed gear portion of the cap actuator to rotate the cap actuator between an activated position and a deactivated position;
   wherein:
   the cap engagement portion defines a cap cavity extending into the cap engagement portion at a bottom actuator end of the cap actuator;
   the cap engagement portion define a fastener hole;
   the valve cap defines a through-hole aligned with the fastener hole; and
   a fastener extends through each of the fastener hole and the through-hole to couple the cap engagement portion to the valve cap.

2. The remotely controlled valve operator of claim 1, wherein the cap cavity defines a cavity axis extending centrally therethrough, and wherein the toothed gear portion of the cap actuator extends radially outward from the cap engagement portion proximate to the bottom actuator end of the cap actuator.

3. The remotely controlled valve operator of claim 1, further comprising an operator housing, wherein the motor of the drive system is housed within the operator housing, and wherein the sprocket and the toothed gear portion of the cap actuator are arranged external to the operator housing.

4. The remotely controlled valve operator of claim 3, wherein:
   the drive system further comprises a drive stem extending from and rotationally driven by the motor;
   the drive stem engages a sprocket flange of the sprocket; and
   the sprocket flange engages a housing opening of the operator housing.

5. The remotely controlled valve operator of claim 4, wherein a packing is mounted to the sprocket flange and is arranged within the housing opening to form a fluid-tight seal between the sprocket flange and the operator housing.

6. The remotely controlled valve operator of claim 3, wherein:
   the operator housing comprises a drive housing portion defining a drive housing cavity and an actuator housing portion defining an actuator housing cavity;
   the motor is housed within the drive housing cavity; and
   at least a portion of the cap engagement portion of the cap actuator is housed within the actuator housing cavity.

7. A remotely controlled valve operator comprising:
a cap actuator comprising a cap engagement portion and a toothed gear portion, the cap engagement portion configured to operatively engage a valve cap of a valve; and
a drive system comprising a motor and a sprocket, the motor remotely controlled by a controller and configured to drive rotation of the sprocket, the sprocket engaging the toothed gear portion of the cap actuator to rotate the cap actuator between an activated position and a deactivated position;
wherein:
the remotely controlled valve operator further comprises a torque transmission device;
the torque transmission device comprising a torque bar, a first foot mounted on the torque bar proximate to a first end of the torque bar, and a second foot mounted on the torque bar proximate to an opposite second end of the torque bar; and
the first foot is configured to secure to a first wall of a meter box and the second foot is configured to secure to an opposing second wall of the meter box.

8. The remotely controlled valve operator of claim 7, wherein:
an operator housing of the remotely controlled valve operator comprises a mounting bracket defining a bar opening therethrough;
the torque bar is formed as a threaded rod and extends through the bar opening;
a first positioning nut is mounted on the threaded rod and tightened against a first bracket side of the mounting bracket; and
a second positioning nut is mounted on the threaded rod and tightened against an opposite second bracket side of the mounting bracket.

9. The remotely controlled valve operator of claim 8, wherein:
the torque bar is formed as a threaded rod;
each of the first foot and the second foot defines a rod fastener, a wall bracket, and a body portion extending between the rod fastener and the wall bracket;
the wall bracket of the first foot is configured to secure to the first wall of the meter box and the wall bracket of the second foot is configured to secure to the opposing second wall of the meter box;
the rod fastener of each of the first foot and the second foot defines a threaded bore; and
the threaded rod is rotationally engaged with the threaded bore.

10. A remotely controlled valve assembly comprising:
a valve comprising a valve body and a valve cap; and
a remotely controlled valve operator comprising:
a cap actuator comprising a cap engagement portion and a toothed gear portion, the cap engagement portion operatively engaged with the valve cap; and
a drive system comprising a motor and a sprocket, the motor remotely controlled by a controller and configured to drive rotation of the sprocket, the sprocket engaging the toothed gear portion of the cap actuator to rotate the cap actuator between an activated position and a deactivated position;
wherein, in the activated position, the cap actuator actuates the valve cap to an open position and fluid is permitted to flow through the valve, and in the deactivated position, the cap actuator actuates the valve cap to a closed position and fluid is prohibited from flowing through the valve;
wherein:
the cap engagement portion defines a cap cavity extending into the cap engagement portion at a bottom actuator end of the cap actuator;
the cap engagement portion defines a fastener hole;
the valve cap defines a through-hole aligned with the fastener hole; and
a fastener extends through each of the fastener hole and the through-hole to couple the cap engagement portion to the valve cap.

11. The remotely controlled valve assembly of claim 10, wherein the cap cavity defines a cavity axis extending centrally therethrough, and wherein the toothed gear portion of the cap actuator extends radially outward from the cap engagement portion proximate to the bottom actuator end of the cap actuator.

12. The remotely controlled valve assembly of claim 10, further comprising an operator housing, wherein the motor of the drive system is housed within the operator housing, and wherein the sprocket and the toothed gear portion of the cap actuator are arranged external to the operator housing.

13. The remotely controlled valve assembly of claim 12, wherein:
the drive system further comprises a drive stem extending from and rotationally driven by the motor;
the drive stem engages a sprocket flange of the sprocket; and
the sprocket flange engages a housing opening of the operator housing.

14. The remotely controlled valve assembly of claim 13, wherein a packing is mounted to the sprocket flange and is arranged within the housing opening to form a fluid-tight seal between the sprocket flange and the operator housing.

15. The remotely controlled valve assembly of claim 12, wherein:
the operator housing comprises a drive housing portion defining a drive housing cavity and an actuator housing portion defining an actuator housing cavity;
the motor is housed within the drive housing cavity; and
at least a portion of the cap engagement portion of the cap actuator is housed within the actuator housing cavity.

16. A remotely controlled valve assembly comprising:
a valve comprising a valve body and a valve cap; and
a remotely controlled valve operator comprising:
a cap actuator comprising a cap engagement portion and a toothed gear portion, the cap engagement portion operatively engaged with the valve cap; and
a drive system comprising a motor and a sprocket, the motor remotely controlled by a controller and configured to drive rotation of the sprocket, the sprocket engaging the toothed gear portion of the cap actuator to rotate the cap actuator between an activated position and a deactivated position;
wherein, in the activated position, the cap actuator actuates the valve cap to an open position and fluid is permitted to flow through the valve, and in the deactivated position, the cap actuator actuates the valve cap to a closed position and fluid is prohibited from flowing through the valve;
wherein:
the remotely controlled valve operator further comprises a torque transmission device;
the torque transmission device comprising a torque bar, a first foot mounted on the torque bar proximate to a first end of the torque bar, and a second foot mounted on the torque bar proximate to an opposite second end of the torque bar; and the first foot is configured to secure to a first wall of a meter box and the second foot is configured to secure to an opposing second wall of the meter box.

17. The remotely controlled valve assembly of claim 16, wherein:
- an operator housing of the remotely controlled valve operator comprises a mounting bracket defining a bar opening therethrough;
- the torque bar is formed as a threaded rod and extends through the bar opening;
- a first positioning nut is mounted on the threaded rod and tightened against a first bracket side of the mounting bracket; and
- a second positioning nut is mounted on the threaded rod and tightened against an opposite second bracket side of the mounting bracket.

18. The remotely controlled valve assembly of claim 16, wherein:
- the torque bar is formed as a threaded rod;
- each of the first foot and the second foot defines a rod fastener, a wall bracket, and a body portion extending between the rod fastener and the wall bracket;
- the wall bracket of the first foot is configured to secure to the first wall of the meter box and the wall bracket of the second foot is configured to secure to the opposing second wall of the meter box;
- the rod fastener of each of the first foot and the second foot defines a threaded bore; and
- the threaded rod is rotationally engaged with the threaded bore.

* * * * *